United States Patent [19]

Bonse et al.

[11] 4,385,603
[45] May 31, 1983

[54] APPARATUS FOR REGULATING THE IDLING RPM IN AN INTERNAL COMBUSTION ENGINE

[75] Inventors: Bernhard Bonse, Korntal; Ulrich Kemmner, Stuttgart; Reinhard Klinkenberg, Markgröningen; Heinrich Knapp, Leonberg; Michael Wissmann, Gerlingen, all of Fed. Rep. of Germany

[73] Assignee: Robert Bosch GmbH, Stuttgart, Fed. Rep. of Germany

[21] Appl. No.: 287,003

[22] Filed: Jul. 27, 1981

[30] Foreign Application Priority Data

Jul. 30, 1980 [DE] Fed. Rep. of Germany ....... 3028898

[51] Int. Cl.³ ............................................. F02B 3/00
[52] U.S. Cl. .................................... 123/339; 123/585
[58] Field of Search .............................. 123/585–589, 123/327, 339; 48/180 A

[56] References Cited

U.S. PATENT DOCUMENTS 4,187,821 2/1980 Zebli ............................. 123/588 X
4,325,349 4/1982 Fehrenbach ........................ 123/327

Primary Examiner—William A. Cuchlinski, Jr.
Attorney, Agent, or Firm—Edwin E. Greigg

[57] ABSTRACT

An apparatus is proposed which serves to regulate the idling rpm of an internal combustion engine. The apparatus includes a bypass line bypassing an arbitrarily actuatable throttle valve in the intake tube. An electromagnetically actuatable bypass valve is disposed in the bypass line for the purpose of controlling supplementary air and is triggerable in accordance with operating characteristics of the engine. In addition, a pressure-sensing adjusting element is also provided, which responds to an abrupt reduction in the intake tube pressure downstream of the throttle device. In accordance with the magnitude of the pressure reduction, this pressure-sensing adjusting element effects a time-limited increase in the supplementary air quantity to the intake tube section downstream of the throttle valve. In the event of an abrupt reduction in the intake tube pressure downstream of the throttle valve, caused by the closure of the throttle valve subsequent to a previous, slight increase in pressure on the gas pedal, the apparatus according to the invention prevents the engine from stopping.

31 Claims, 8 Drawing Figures

APPARATUS FOR REGULATING THE IDLING RPM IN AN INTERNAL COMBUSTION ENGINE

BACKGROUND OF THE INVENTION

The invention is based on an apparatus for regulating the idling rpm of an internal combustion engine of the generic type described by the preamble to the main claim. An apparatus for regulating the idling rpm of an internal combustion engine is already known, but this apparatus has the disadvantage that if there is slightly increased pressure on the gas pedal, the regulation apparatus attempts to lower the increasing engine rpm once again by closing the bypass line. If while this situation prevails the gas pedal is then retracted once again, closing the throttle valve, then the intake tube pressure downstream of the throttle valve is rapidly reduced, and the engine will receive too little air to continue running. This can cause the engine to stop, because the reduced rpm is established only after a certain "dead time" has elapsed, and the correction in the regulation which is thereupon effected by means of opening the bypass line likewise takes effect only after a certain "dead time" has elapsed.

OBJECT AND SUMMARY OF THE INVENTION

The apparatus according to the invention for regulating the idling rpm of an internal combustion engine having the characteristics of the main claim has the advantage over the prior art that it utilizes the signal for the change in intake tube pressure downstream of the throttle valve, which is a faster signal than the signal pertaining to rpm. As a result, if there is an abrupt closure of the throttle valve and an attendant abrupt drop in intake tube pressure downstream of the throttle valve, the apparatus according to the invention prevents engine stalling by increasing the supplementary air quantity.

Advantageous modifications of and improvements to the apparatus disclosed in the main claim can be attained by means of the characteristics disclosed in the dependent claims.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
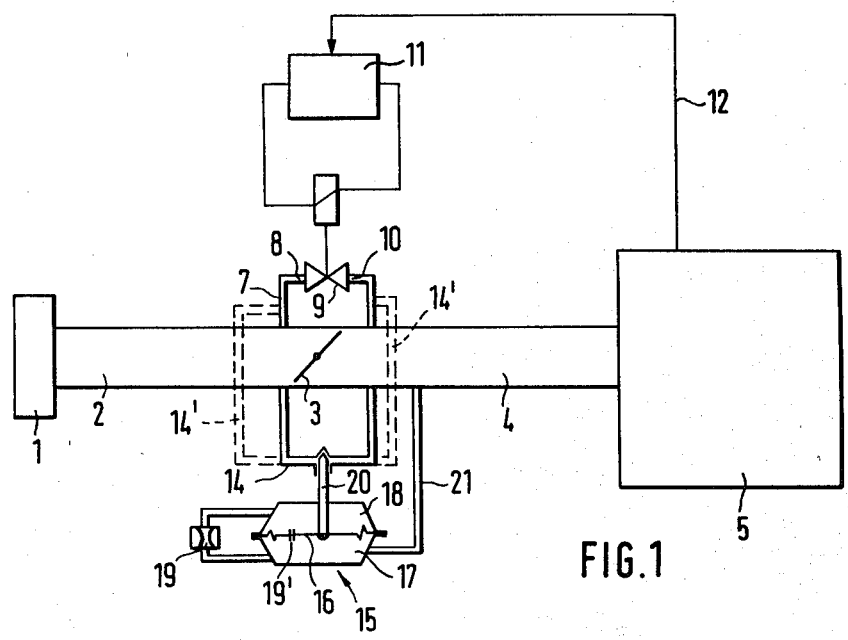
FIG. 1 shows a first exemplary embodiment of an apparatus for regulating the idling rpm of an internal combustion engine.

In the first exemplary embodiment, shown in FIG. 1, of an apparatus for regulating the idling rpm of an internal combustion engine, air required for combustion flows through an air filter 1 into an intake tube section 2 upstream of a throttle valve 3 acting as the throttling device and flows downstream of the throttle valve 3 via an intake tube section 4 to an internal combustion engine 5. A bypass line 7 having a connection 8 upstream of an electromagnetically actuatable bypass valve 9 and a connection 10 downstream of the bypass valve 9 bypasses the throttle valve 3. The bypass line 7 is controlled by means of an electronic control device into which the values of operating characteristics 12 of the engine, such as the signal for rpm derived from the ignition distributor, the engine temperature or the position of the throttle valve, are fed. The flowthrough cross section of the bypass line 7 is variable by the bypass valve 9, when the throttle valve 3 is in the idling position, in such a manner that if the engine rpm should drop, the flowthrough cross section of the bypass line is increased, and thus more supplementary air flows through the bypass line 7 around the throttle valve 3, while if there is an increase in the idling rpm then the flowthrough cross section of the bypass line 7—and thus the quantity of supplementary air flowing through the bypass line 7—is reduced.

A shunt line 14 is disposed such that it bypasses the bypass valve 9. This shunt line 14 connects the intake tube section 2 upstream of the throttle valve 3 with the intake tube section 4 downstream of the throttle valve 3. The shunt line 14 could just as well branch off from the bypass line 7 before the bypass valve 9, as indicated by broken lines at 14', and then discharge back into the bypass line 7 after the bypass valve 9. The flowthrough cross section of the shunt line 14 is controllable by a pressure-sensing adjusting element 15. The pressure-sensing element 15 has a diaphragm 16 in the form of a yielding wall, which separates a first chamber 17, communicating with the intake tube section 4 downstream of the throttle valve 3, from a second chamber 18, which communicates with the first chamber 17 via a throttle restriction 19. The communication between the first chamber 17 and the second chamber 18 could equally well be effected via a throttle restriction 19' in the diaphragm 16. A movable valve element 20 is coupled with the diaphragm 16, opening the flowthrough cross section of the shunt line 14 to a greater or lesser extent in accordance with the pressure forces at either side of the diaphragm 16.

Now, if there is slight pressure on the gas pedal, that is, if the throttle valve is opened somewhat, then the rpm of the engine 5 increases somewhat, and the regulation apparatus attempts to counteract this by closing the bypass valve 9. If the gas pedal is retracted at this time, that is, if the throttle valve closes after being slightly opened, then the intake tube pressure downstream of the throttle valve 3 drops rapidly. The result is that the engine 5 receives too little air, and as a consequence, the rpm will drop. This drop in rpm of the engine 5 occurs only after a certain dead time, however, and since the regulation of the bypass valve 9 also takes effect, opening the bypass valve 9, only after a certain dead time, it can happen that the engine will come to a stop. In order to prevent this from happening, the first chamber 17 of the adjusting element 15 is connected via the underpressure line 21 with the intake tube section 4 downstream of the throttle valve 3. As a result, when there is an abrupt drop in the intake tube pressure downstream of the throttle valve 3, the diaphragm 16 of the adjusting element 15 is moved inward into the first chamber 17. This pulls the movable valve element 20 in the opening direction of the shunt line 14, so that there is a delivery of supplementary air to the engine via the shunt line 14, past the bypass valve 9, virtually without delay after there has been a pressure drop downstream of the throttle valve 3. This occurs before the drop in the rpm of the engine 5 has become so extensive that regulation effected via the bypass valve 9 would occur too late and the engine would stop. Since the first chamber 17 and the second chamber 18 of the adjusting element 15 communicate with one another via the throttle restriction 19 or 19', the supply of supplementary air is effected via the shunt line 14 in a manner which is limited in terms of time, until virtually equal pressure again prevails in the two chambers 17 and 18, and the movable valve element 20 closes the shunt line 14. The adjusting element 15 thus has a differentiation function.

Figure 2:
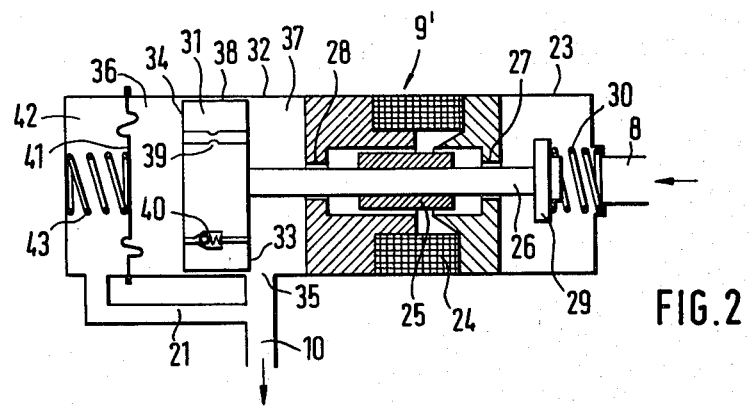
FIG. 2 shows a second exemplary embodiment of an apparatus for regulating the idling rpm of an internal combustion engine.

In the following exemplary embodiments, elements having the same function as those of the first embodiment shown in FIG. 1 and in comparison with one another are identified by the same reference numerals. The bypass valve 9' shown in FIG. 2 has a valve housing 23, in which an electromagnet system is provided, having an electromagnet coil 24 and an armature 25 movably disposed therein. An actuation rod 26 is connected with the armature 25, being slidably supported at bearing points 27, 28 and having a restoring spring 30 engaging its end 29. The actuation rod 26 is likewise connected with a valve piston 31 acting as the movable valve element of the bypass valve 9'. The movement of the actuation rod 26 causes the valve piston 31 to be axially movable within a cylinder bore 32. The valve piston 31 has a control face 33 on the right, transversely disposed relative to the actuation rod 26, and a counterpart face 34 on the side remote therefrom. The intake tube pressure in the intake tube section 2 upstream of the throttle valve 3 is exerted via the connection 8 on the control face 33. Depending upon the state of excitation of the electromagnet system 24, 25, the valve piston 31 covers to a greater or lesser extent an valve opening 35, by way of which the supplementary air can flow from the connection 8 to the connection 10. The counterpart face 34 of the valve piston 31 defines a work chamber 36 which communicates via at least one throttle restriction 37, which is defined on one side by the control face 33 and communicates with the intake tube pressure upstream of the throttle valve 3. Serving as the throttle restriction between the work chamber 36 and the control chamber 37 may be either the annular gap 38 between the circumference of the valve piston 31 and the diameter of the cylinder bore 32, or a throttle restriction 39 disposed in the valve piston 31. In like manner, a check valve 40 may be disposed in the valve piston 31 in a line connecting the work chamber 36 and the control chamber 37, the check valve 40 opening toward the control chamber 37 when there is a certain overpressure in the work chamber 36. The work chamber 36 is defined on the other side by a diaphragm 41 in the form of a yielding wall, on the side of which remote from the work chamber 36 a compression spring 43 is supported within an underpressure chamber 42. The underpressure chamber 42 communicates via the underpressure line 21 with the intake tube section 4 downstream of the throttle valve 3. When the electromagnet system 24, 25 is the nonexcited state, the valve piston 31 is displaced toward the left, as viewed in the drawing, by the restoring spring 30 to such an extent that the valve opening 35 is fully opened, and thus the maximum quantity of supplementary air can flow through the bypass line 7. Now, if a sudden drop occurs in the intake tube pressure downstream of the throttle valve 3, in a state in which the valve piston 31 is at least partially closing the valve opening 35, then the diaphragm 41 is moved into the underpressure chamber 42, counter to the force of the compression spring 43. The result of this is that the pressure in the work chamber 36 also drops, and because of the differing pressures acting on either side of the valve piston 31 the piston 31 is moved into the work chamber 36. Thus, the valve opening 35 is opened wider, so that a larger quantity of supplementary air is delivered via the bypass line 7. The displacement is limited in terms of time, until the pressures in the work chamber 36 and the control chamber 37 have been equalized via the throttle restriction 38, 39. With an appropriate embodiment of the throttle restriction 38, 39 and of the work chamber 36, this time-related behavior can be set in a desired manner. In order to prevent a displacement of the valve piston 31 in the case of an abrupt pressure increase in the intake the section 4 downstream of the throttle valve 3, the check valve 40 is provided. If there is an abrupt increase in pressure in the work chamber 36, a pressure equalization with the control chamber 37 can be effected by way of this check valve 40.

Figure 3:
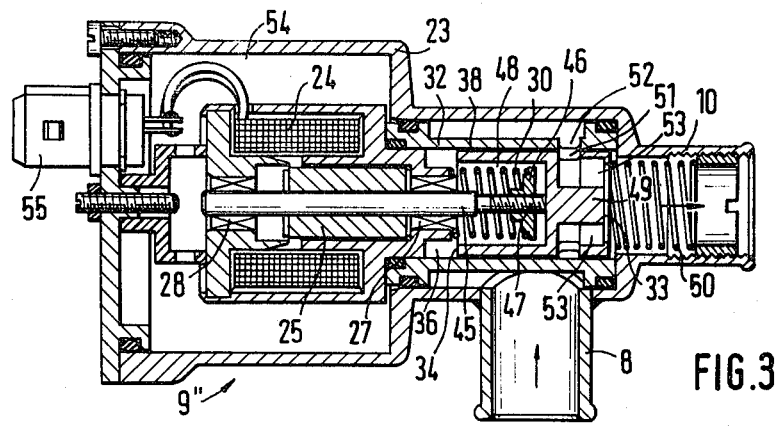
FIG. 3 shows in cross section a third exemplary embodiment of an apparatus for regulating the idling rpm of an internal combustion engine.

In the case of the bypass valve 9'' of FIG. 3, an actuation member 45 supported at the bearing points 27, 28 is connected with the armature 25 and is engaged via a spring plate 46 by the restoring spring 30. The restoring spring 30 and one end 47 protrude into a cavity 48 of the valve piston 49. There is not a fixed coupling between the end 47 and the valve piston 49; instead, a differential pressure spring 50 supported on the control face 33 of the valve piston 49 tends to keep the valve piston 49 in contact with the end 47 of the actuation member 45. The valve piston 49 has a circumferential groove 51, which depending on the position of the valve piston 49 overlaps a control slit 52 communicating with the connection 8 (that is, with the intake tube pressure upstream of the throttle valve 3) to a greater or lesser extent. At the other side, the circumferential groove 51 has openings 53 toward the control face 33 of the valve piston 49, at which the intake tube pressure downstream of the throttle valve 3 prevails. The work chamber 36, into which the valve piston protrudes with its counterpart face 34, communicates via the throttling annular gap 38, which is formed between the circumference of the valve piston 49 and the diameter of the cylinder bore 32, with the intake tube pressure downstream of the throttle valve 3 at the control face 33; if necessary, the work chamber 36 may extend via the bearing points 27, 28 as far as a flushing chamber 54, which is enclosed between the housing 23 and the electromagnet system 24, 25. The electrical connection of the electromagnet system is effected via a plug connection 55. When the electromagnet system 24, 25 is not excited, the restoring spring 30 displaces the actuation member 45 so far to the right that the value piston 49 is held in the open position of the bypass valve 9". If the electromagnet system 24, 25 is now excited, then the actuation member 45 is drawn toward the left, and the valve piston 49, because of the spring force of the differential pressure spring 50, follows up this movement, moving in the closing direction of the bypass valve. The spring force of the restoring spring 30 is greater than that of the differential pressure spring 50. Now when the valve piston 49 is in a position in which the control slit 52 is completely closed, or is at least only partially open, if there is a sudden drop in the intake tube pressure 4 downstream of the throttle valve 3, then the valve piston 49, acting as a pressure-sensing adjusting element, is displaced toward the right, counter to the force of the differential pressure spring 50, as the result of the differing pressures being exerted at either end of the valve piston 49, thus moving away from the actuation member 45. The result is that the control slit 52 is opened wider, and a greater quantity of supplementary air can flow through the bypass valve 9". This displacement of the valve piston 49 is effected in a time-limited manner until such time as the pressure in the work chamber 36 has dropped, via the throttling annular gap 38, far enough that the pressure force exerted on the counterpart face 34 is equal to the pressure force exerted on the control face 33 and the force of the differential pressure spring 50, causing the valve piston 49 to return to a state of contact with the end 47 of the actuation member 45. The differential pressure spring 50 advantageously has a steeply inclined spring characteristic, so that if there is an abrupt reduction in pressure in the intake tube downstream of the throttle valve 3 when the bypass valve is virtually closed, a smaller pressure drop engaging the valve piston 49 is required to displace the valve piston into the opening position than would be the case in a more widely opened position of the valve piston 49.

Figure 4:
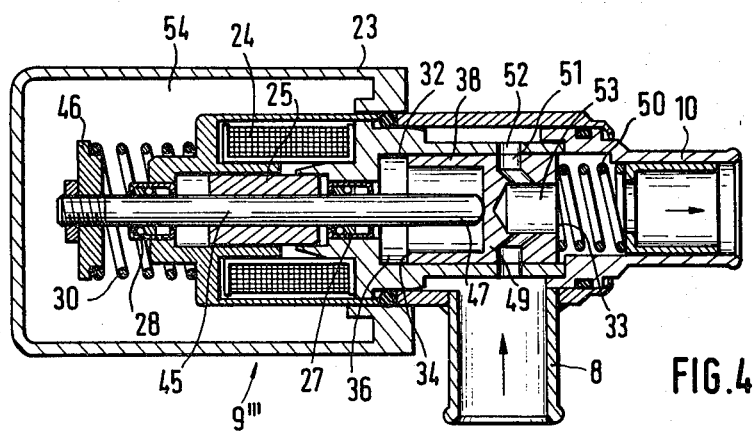
FIG. 4 shows in cross section a fourth exemplary embodiment of an apparatus for regulating the idling rpm of an internal combustion engine.

The bypass valve 9''' shown in FIG. 4 differs from the bypass valve 9" of FIG. 3 substantially in that the restoring spring 45 engages the left end of the actuation member 30 via the spring plate 46. Thus when the electromagnet system 24, 25 is not excited, the actuation member 45 is displaced toward the left, and the valve piston 49, again acting as a pressure-sensing adjusting element loosely contacting the end 47, is caused by the differential pressure spring 50 to follow up the movement of the actuation member 45, that is, into the closing position of the bypass valve 9'''. When the electromagnet system 24, 25 is excited, there is a displacement of the actuation member 45 and accordingly of the valve piston 49 in the opening direction of the bypass valve 9'''.

Figure 5:
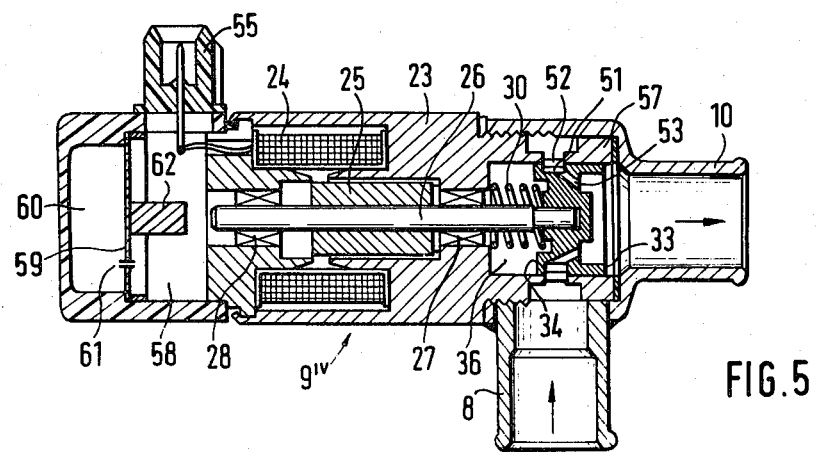
FIG. 5 shows in cross section a fifth exemplary embodiment of an apparatus for regulating the idling rpm of an internal combustion engine.

In the case of the bypass valve 9'$^v$ shown in FIG. 5, the valve piston 57 is firmly connected with the actuation rod 26, and in the non-excited state of the electromagnet system 24, 25 it is held by the restoring spring 30 in the opening position of the bypass valve 9'$^v$. On the end of the bypass valve 9'$^v$ remote from the valve piston 57, an underpressure chamber 58 is provided which communicates via the bearing points 27, 28 and the non-throttling play at the circumference of the valve piston 57 with the connection 10, and accordingly with the intake tube pressure 4 downstream of the throttle valve 3. The underpressure chamber 58 is separated from an equalization chamber 60 by a yielding wall embodied as a diaphragm 59. The equalization chamber 60 communicates, via a throttle restriction 61 provided by way of example in the diaphragm 59, with the underpressure chamber 58. A knob 62 is secured to the diaphragm in axial alignment with the actuation rod. If there is slight pressure on the gas pedal and then a sudden retraction of the gas pedal, causing an abrupt decrease in pressure in the intake tube downstream of the throttle valve 3, then the diaphragm 59 is moved into the underpressure chamber 58 as the result of the differing pressure forces acting upon it; in consequence, with the knob 62 engaging the actuation rod 26, the diaphragm 59 displaces the valve piston 57 in a time-limited manner in the direction of an enlargement of the opening position of the bypass valve 9'$^v$, until a pressure equalization in the underpressure chamber 58 and the equalization chamber 60 has been effected via the throttle restriction 61.

Figure 6:
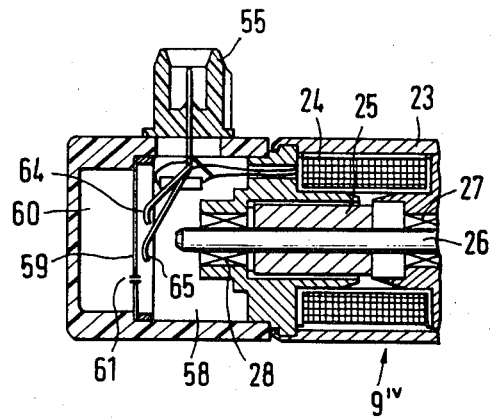
FIG. 6 shows in cross section a sixth exemplary embodiment of an apparatus for regulating the idling rpm of an internal combustion engine.
Figure 7:
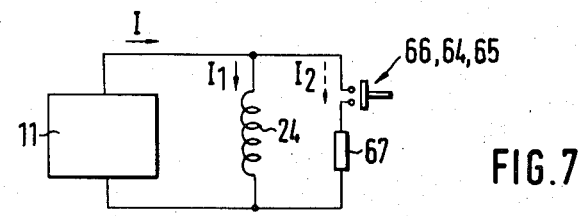
FIG. 7 shows an electrical circuit diagram.

In the exemplary embodiment according to FIG. 6, the diaphragm 59 does not have a knob 62 for displacing the actuation rod 26; instead, the diaphragm 59 is embodied such that either it is itself electrically conductive or it has an electrically conductive region with which it moves into the underpressure chamber 58 if there is a sudden reduction of the intake tube pressure 4 downstream of the throttle valve 3, thereby closing switch contacts 64, 65 or a switch 66 (FIG. 7). As shown in FIG. 7, the switch 66 or the switch contacts 64, 65 and an electric resistor 67 are disposed in a branch of the current circuit of the electromagnet coil 24 parallel to the electromagnet coil 24. When the switch 66 or the switch contacts 64, 65 close, the electric current $I_1$ at the electromagnet coil 24 is thus reduced by the amount of the current $I_2$ flowing over the resistor 67, so that the following formula applies, with I being the current furnished by the control device 11: $I_1 = I - I_2$. The reduction of the current $I_1$ at the electromagnet coil 24 signifies a reduction of the magnetic force of the electromagnet system 24, 25. As a result, the restoring spring 30 displaces the valve piston 57 in the direction of an enlargement of the opening position of the bypass valve 9'$^v$ until such time as there has been a re-equalization of pressure in the underpressure chamber 58 and the equalization chamber 60 via the throttle restriction 61, and the diaphragm 59 opens the switch 66 or the switch contacts 64, 65.

Figure 8:
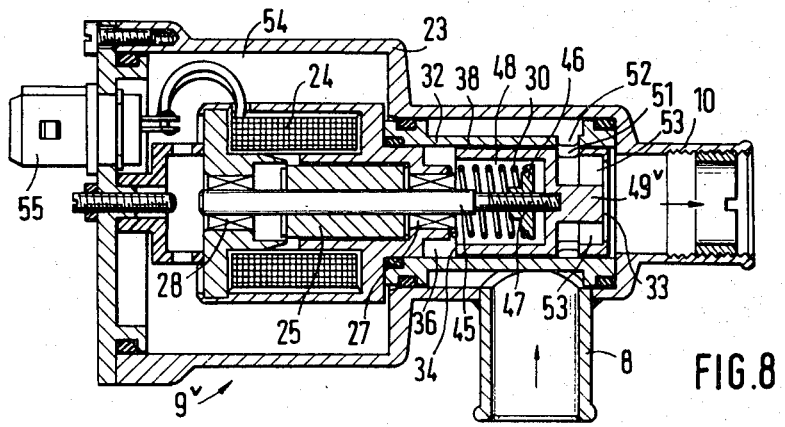
FIG. 8 shows in cross section a seventh exemplary embodiment of an apparatus for regulating the idling rpm of an internal combustion engine.

The exemplary embodiment of a bypass valve 9$^v$ shown in FIG. 8 differs from the bypass valve 9" shown in FIG. 3 substantially in that the end 47 of the actuation member is firmly connected with the valve piston 49$^v$ and that there is no differential pressure spring 50.

Now, if the valve piston 49$^v$ is in a position in which the control slit 52 is fully closed or is at least only partially opened and a sudden reduction in the intake tube pressure 4 downstream of the throttle valve 3 occurs, then the valve piston 49$^v$, acting as a pressure-sensing adjusting element, is displaced to the right, counter to the magnetic force, as the result of the differing pressure forces engaging either end of the valve piston 49$^v$. The result is that the control slit 52 is opened more widely, and a greater quantity of supplementary air can flow through the bypass valve 9$^v$. This displacement of the valve piston 49$^v$ is effected in a time-limited manner until such time as the pressure in the work chamber 36 has dropped, via the throttling annular gap 38, far enough that the pressure force on the counterpart face 34 is equal to the pressure force on the control face 33.

All the exemplary embodiments accordingly permit an automatic and time-limited supply of supplementary air whenever there is an abrupt drop in intake tube pressure downstream of the throttle valve 3, thus reliably assuring continued operation of the internal combustion engine if there is a sudden retraction of the gas pedal following a previous slight increase in pressure on the gas pedal.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. An apparatus for regulating the idling rpm of an internal combustion engine having an intake tube in which an arbitrarily actuable throttle device is disposed, a bypass line arranged to bypass said throttle device, said line including a bypass valve electromagnetically triggerable in accordance with operating characteristics of the engine for controlling supplementary air, the improvement comprising a housed pressure-sensing adjusting element arranged to respond to an abrupt reduction in said intake tube pressure downstream of said throttle device and thereby effect an increase in the supplementary air quantity to said intake tube section downstream of said throttle device in accordance with the magnitude of the pressure reduction and in a time-related manner, said pressure-sensing adjusting element including a yielding wall separating a first chamber which communicates with said intake tube section downstream of said throttle device from a second chamber which communicates with said first chamber via a throttle restriction, and said pressure-sensing adjusting element being coupled with a movable valve element, whereby upon equal pressures being provided in said first and said second chambers said pressure-sensitive adjusting element closes a shunt line bypassing the bypass valve and wherein when there is lower pressure in the first chamber than in the second chamber said pressure sensitive adjusting element opens said shunt line.

2. An apparatus as defined by claim 1, characterized in that said yielding wall of said pressure-sensing adjusting element includes a diaphragm.

3. An apparatus as defined by claim 1, characterized in that said bypass valve further includes a valve piston supported in an axially displaceable manner, said valve piston arranged to be influenced by an electromagnet system triggerable in accordance with operating characteristics of said engine.

4. An apparatus as defined by claim 3, characterized in that said valve piston is displaceable counter to the force of a restoring spring by said electromagnet system in the closing direction of the bypass valve.

5. An apparatus as defined by claim 4, characterized in that said valve piston has a control face and a counterpart face arranged to open said bypass line to a greater or lesser extent and further that said control face is subjected to said intake tube pressure upstream of said throttle device, said counterpart face is arranged to protrude into a work chamber which likewise communicates, via at least one throttle restriction, with said intake tube pressure upstream of said throttle device and further wherein said counterpart face is in proximity to a yielding wall which is engaged on the face remote from said work chamber by a compression spring and by said intake tube pressure downstream of said throttle device.

6. An apparatus as defined by claim 5, characterized in that said valve piston is movable within a cylinder bore of said valve housing, and further that at least one of said throttle restrictions is provided between an annular gap disposed between the circumference of said valve piston and said cylinder bore in said housing.

7. An apparatus as defined by claim 5, characterized in that another throttle restriction is provided within said valve piston.

8. An apparatus as defined by claim 5, characterized in that said work chamber is capable of being relieved of pressure via a check valve toward said intake tube pressure side upstream of said throttle device.

9. An apparatus as defined by claim 3, characterized in that said electromagnet system is embodied by an electromagnet coil, an armature arranged to protrude into said electromagnet coil, said armature being connected with an actuation member, said actuation member arranged to control movement of said valve piston in the closing direction of said bypass valve.

10. An apparatus as defined by claim 9, characterized in that said actuation member engages a restoring spring, in the non-excited state of the electromagnet system thereby displacing said actuation member into a position in which said actuation member keeps the valve piston in the opening position of said bypass valve.

11. An apparatus as defined by claim 10, characterized in that said valve piston engages a differential pressure spring in the closing direction of said bypass valve and said differential pressure spring having a force less than that of said restoring spring.

12. An apparatus as defined by claim 11, characterized in that said valve piston has a control face and a counterpart face and further that said control face is subjected to said intake tube pressure downstream of said throttle device and to said differential pressure spring while said counterpart face is arranged to protrude into a work chamber which communicates via at least one throttle restriction with said intake tube pressure downstream of said throttle device.

13. An apparatus as defined by claim 12, characterized in that said pressure-sensing adjusting element comprises said valve piston further wherein said valve piston is capable of being displaced in the opening direction of the bypass valve by the differing pressure forces engaging said valve piston, until an equalization of pressure has been effected in said work chamber via said throttle restriction.

14. An apparatus as defined by claim 13, characterized in that said valve piston is movable within a cylinder bore of said housing, and further that at least one of said throttle restrictions is provided between an annular gap disposed between the circumference of said valve piston and said cylinder bore in said housing.

15. An apparatus as defined by claim 14, characterized in that said valve piston further includes a circumferential groove which is adapted to overlap a control slit in means arranged to communicate with said intake tube pressure upstream of said throttle device, said valve piston further including means defining openings which extend toward said control face of said valve piston.

16. An apparatus as defined by claim 11, characterized in that said differential pressure spring has a steeply inclined spring characteristic.

17. An apparatus as defined by claim 3, characterized in that said electromagnet system comprises an electromagnet coil and an armature which is adapted to protrude into said electromagnet coil, said armature being connected with an actuation member which is enaged by a restoring spring arranged to displace said actuation member into a position in which the valve piston is displaced in the closing direction of said bypass valve by a differential pressure spring, and further that when the electromagnet system is excited said valve piston is displaceable by said actuation member in the opening direction of said bypass valve.

18. An apparatus as defined by claim 17, characterized in that said valve piston has a control face and a counterpart face, and further that said control face is subjected to said intake tube pressure downstream of the throttle device and to a differential pressure spring, while said counterpart face is adapted to protrude into a work chamber which communicates via at least one throttle restriction with said intake tube pressure downstream of said throttle device.

19. An apparatus as defined by claim 18, characterized in that said pressure-sensing adjusting element comprises said valve piston further wherein said valve piston is capable of being displaced when there is an abrupt reduction in the intake tube pressure into the opening position of the bypass valve until such time as an equalization of pressure has been effected in said work chamber via said throttle restriction.

20. An apparatus as defined by claim 19, characterized in that said valve piston is movable within a cylinder bore further that at least one of said throttle restrictions is provided between an annular gap disposed between the circumferences of said valve piston and said cylinder bore in said housing.

21. An apparatus as defined by claim 20, characterized in that said valve piston further includes a circumferential groove, which is adapted to overlap a control slit in means arranged to communicate with said intake tube pressure upstream of said throttle device, said valve piston further including means defining openings which extend toward said control face of said valve piston.

22. An apparatus as defined by claim 21, characterized in that said differential pressure spring has a steeply inclined spring characteristic.

23. An apparatus as defined by claim 4, characterized in that said pressure-sensing adjusting element comprises a yielding wall which separates an underpressure chamber which communicates with said intake tube pressure downstream of said throttle device from an equalization chamber which communicates via a throttle restriction with said underpressure chamber.

24. An apparatus as defined by claim 23, characterized in that in the event of an abrupt reduction in said intake tube pressure downstream of said throttle device, said valve piston is displaced by said yielding wall in the direction of an enlargement of the opening position of said bypass valve, until a re-equalization of pressure has taken place between said underpressure chamber and the equalization chamber via said throttle restriction.

25. An apparatus as defined by claim 23, characterized in that in the event of an abrupt reduction of said intake tube pressure downstream of said throttle device, said yielding wall actuates switch means to interrupt an electrical current circuit of said electromagnet coil in such a manner that an armature of said electromagnet coil and said valve piston execute a movement to enlarge an opening position of said bypass valve, until a re-equalization of pressure has taken place between said underpressure chamber and said equalization chamber via said throttle restriction.

26. An apparatus as defined by claim 25, characterized in that an electric resistor and said switch means are disposed parallel to said electromagnet coil, so that an abrupt reduction in said intake tube pressure downstream of said throttle device said switch means are closed by said yielding wall to reduce said electric current at said electromagnet coil.

27. An apparatus as defined by claim 24 or 25, characterized in that said yielding wall comprises a diaphragm.

28. An apparatus as defined by claim 27, characterized in that said diaphragm further includes said throttle restriction which is adapted to connect said underpressure chamber and said equalization chamber.

29. An apparatus as defined by claim 4, characterized in that said pressure-sensing adjusting element further includes said valve piston which is connected with an armature of said electromagnet system said valve piston provided with a control face and a counterpart face and movably disposed in a cylinder bore of said housing, said control face being subjected to said intake tube pressure downstream of said throttle device, while said counterpart face is arranged to protrude into a work chamber, which communicates via at least one throttle restriction with said intake tube pressure downstream of said throttle device.

30. An apparatus as defined by claim 29, characterized in that said valve piston has a circumference, said housing includes said cylinder bore and an annular gap between said piston circumference and said cylinder bore provide a throttle restriction.

31. An apparatus as defined by claim 30, characterized in that said valve piston further includes a circumferential groove arranged to overlap a control slit which communicates with said intake tube pressure upstream of said throttle device and in proximity to said control slit other means defining openings are provided in said valve piston.

* * * * *